No. 715,614. Patented Dec. 9, 1902.
D. D. SHAW.
MOTIVE POWER FOR OPERATING SYSTEMS OF PUMPS.
(Application filed Mar. 11, 1902.)

(No Model.) 2 Sheets—Sheet 1.

Witnesses
A. B. Williams
L. G. Handy

Inventor
Daniel D. Shaw
By Mason Fenwick Lawrence
Attorneys

No. 715,614. Patented Dec. 9, 1902.
D. D. SHAW.
MOTIVE POWER FOR OPERATING SYSTEMS OF PUMPS.
(Application filed Mar. 11, 1902.)
(No Model.) 2 Sheets—Sheet 2.
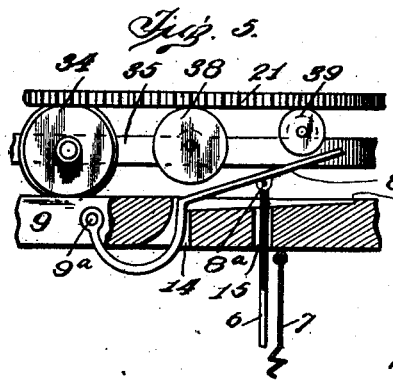
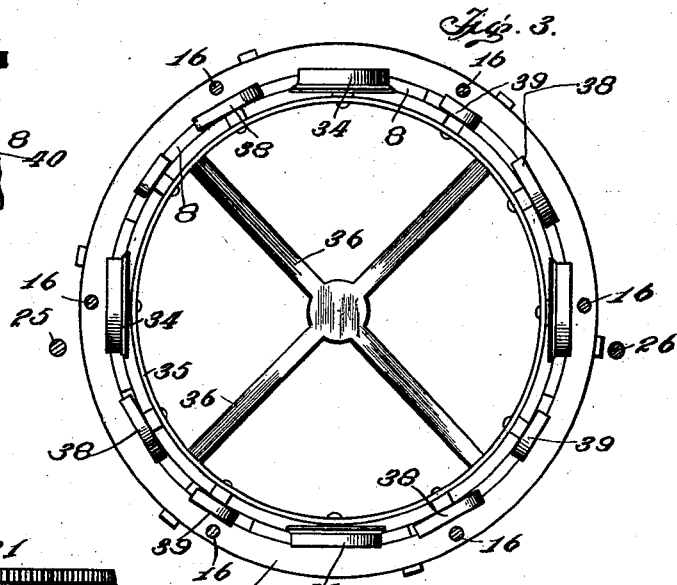
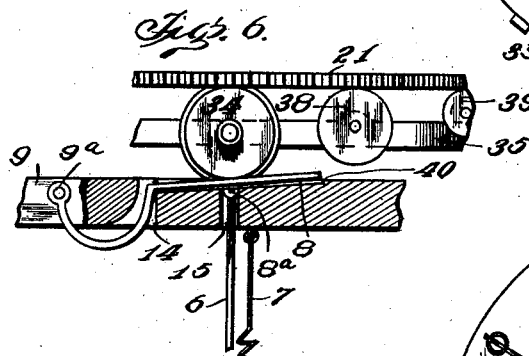
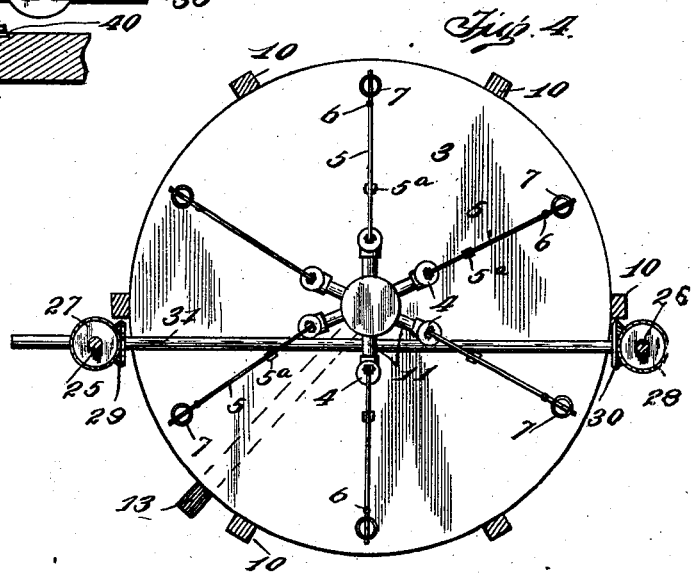
Inventor
Daniel D. Shaw
Witnesses
A. B. Williams
L. G. Handy
By
Mason Fenwick Lawrence
Attorneys

UNITED STATES PATENT OFFICE.

DANIEL D. SHAW, OF DENVER, COLORADO.

MOTIVE POWER FOR OPERATING SYSTEMS OF PUMPS.

SPECIFICATION forming part of Letters Patent No. 715,614, dated December 9, 1902.

Application filed March 11, 1902. Serial No. 97,745. (No model.)

*To all whom it may concern:*

Be it known that I, DANIEL D. SHAW, a citizen of the United States, residing at Denver, in the county of Arapahoe and State of Colorado, have invented certain new and useful Improvements in Motive Power for Operating a System of Pumps; and I do hereby declare the following to be a full, clear, and exact description of the invention, such as will enable others skilled in the art to which it appertains to make and use the same.

The present invention consists in an improvement in motive mechanism for operating a system of pumps, the object being to provide a device of the class stated which shall be possessed of great capacity and capable of forcing water to any desired height for irrigation or other purposes, the pumping mechanism being comparatively simple in construction, economical in cost, reliable, durable, and efficient in use.

It consists in a pump-operating mechanism comprising a series of levers connected with the pumps to be operated, a series of actuating-levers connected with said pump-levers, springs for moving the said actuating-levers in one direction, a frame carrying a series of wheels or rollers for connecting said levers and moving them against the action of said spring, and means for rotating said frame carrying the wheels, whereby they will be caused to engage and operate the levers successively.

It also consists in certain other novel constructions, combinations, and arrangements of parts, as will be hereinafter fully described and claimed.

Figure 1:
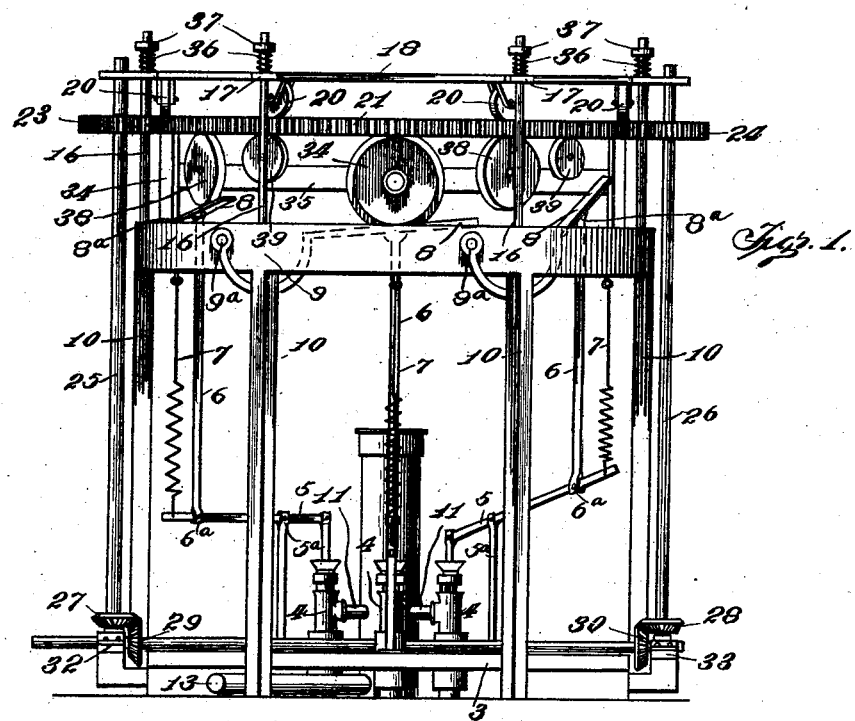
Figure 2:
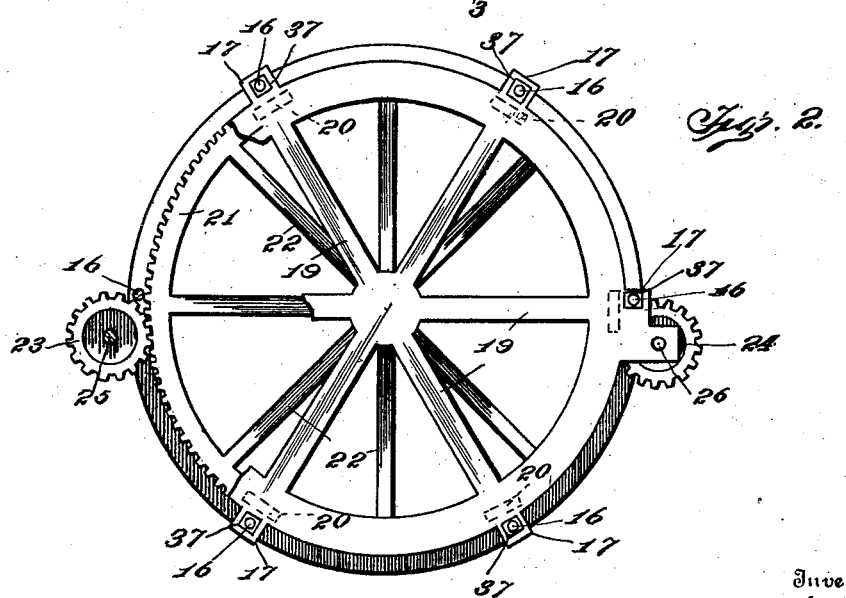
Figure 1:
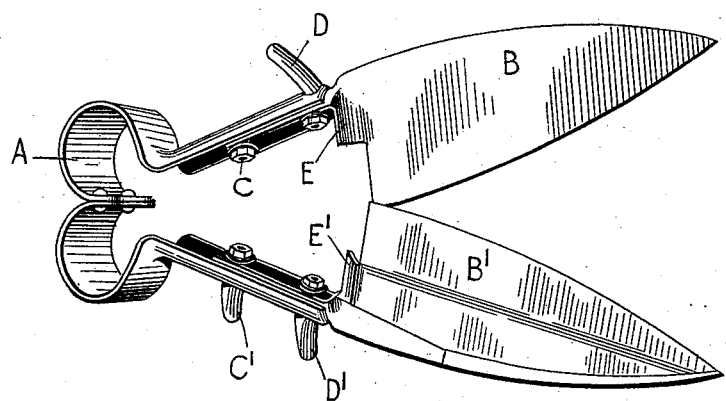
Figure 3:
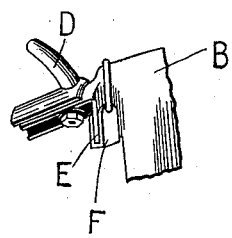
Figure 2:
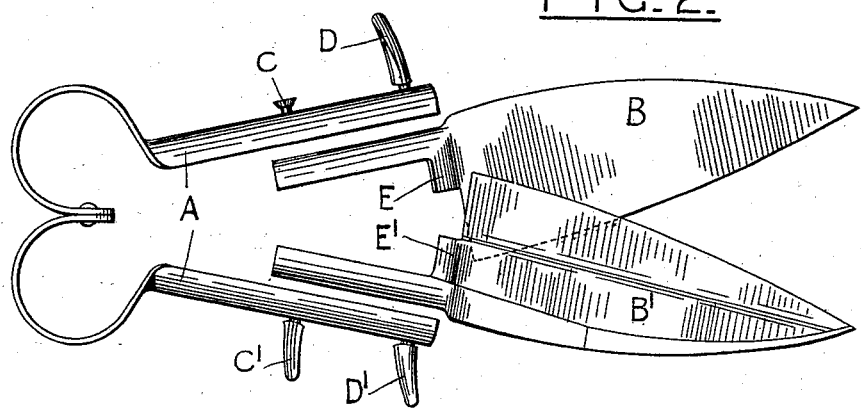

In the accompanying drawings, Figure 1 represents a side elevation of a pump-operating mechanism constructed in accordance with the present invention. Fig. 2 is a top plan view of the same, a portion of the frame being broken away to reveal some of the gear of the device. Fig. 3 is a top plan view of a portion of the machine-frame, showing the rollers or wheels and the frame or wheel which carries the same. Fig. 4 is a horizontal sectional view through the frame of the machine, showing the levers connected with the pumps. Figs. 5 and 6 are detailed sectional views showing the mounting of the actuating-levers and their relation to the operating rollers or wheels.

The invention contemplated employs means for operating a series of pumps so arranged that some or all of them may be operated simultaneously or successively, as may be found desirable. A number of pumps can be employed; but for the sake of illustration I have shown in the drawings six pumps 4, preferably grouped about a central air-chamber and outlet-pipe 12. Each of the pumps is supported on a base or floor, as 3, and is connected with the air-chamber 12 by pipes 11. The air-chamber 12 may be formed in any suitable manner, having an outlet at its lower end, connected with the discharge-pipe 13. Mounted upon a platform 3, in suitable proximity to pumps 4, are standards $5^a$, which rise, preferably, above the upper ends of the pumps and are bifurcated at their upper ends to receive pump-operating levers 5, one lever being provided for each pump. The levers 5 extend toward the pumps at their inner ends and are pivotally connected with the piston-rods of the pumps, while the outer ends of the said levers are connected with the upper portion of the machine-frame 9 by means of springs 7, which normally tend to draw the outer ends of the said levers upwardly, thereby effecting continuing movement to the pump-pistons. The floor 3, as well as the upper portion of the frame 9, is supported upon a series of posts or standards 10 10, arranged about the machine. Pivoted at a suitable point with respect to the pumps, as at $9^a$, are a series of actuating-levers 8, which are connected, by means of rods 6, with the levers 5. Each of the rods 6 pivotally engages a lever 5 at $6^a$ and connects the same with its corresponding operating-lever 8, being pivotally joined to the latter at $8^a$. Operating-levers $8^a$ may be pivoted to the frame 9 in any suitable or desired manner; but I prefer to form the said levers with a curved or hooked end portion which is fulcrumed, as shown in Figs. 1, 5, and 6. This curved portion in the levers permits the same to be pivoted on the outside of the frame 9, and yet allows its outer end to be passed upwardly through an aperture in the said frame to lie in a recess 40, formed in the upper surface or top of the frame 9. The greater portion of the lever 8 is made in the form of a broad flat bar, which when resting in the recess 40 is flush with the upper surface of the frame 9. These levers normally are raised out of the recess 40 by the action of the spring 7. Running upon the top of the frame 9 are a series of flange-wheels 34, which are connected by a separate and well-established frame 35, preferably formed more or less open and having a ring at its periphery, and connecting-arms 36, forming a central spider at the center, as will be understood by reference to Fig. 3. Upon the ring of this frame 35 are journaled smaller rollers or wheels 38 and 39, the rollers 39 being quite small and the rollers 38 being of an intermediate size with relation to the rollers 34 and 39. The rollers or wheels are preferably arranged in groups, each group containing one large roller 34, one intermediate roller 38, and one small roller 39. The rollers or wheels 38 and 39 are so arranged upon the frame 35 that they do not rest upon the frame 9; but their outer edges are arranged in a plane with the upper edges of the rollers or wheels 34, so that the large gear-wheel 21, resting upon the rollers 34, will also rest upon each of the rollers 38 and 39. The gear-wheel 21 is held in position by the flanges of the wheels 34 and rests movably upon all of the wheels or said rollers. The gear-wheel 21 is connected by one or more gears or pinions, as 23 and 24, which are secured to vertical shafts 25 and 26, extending to a point near the base of the machine. Each of the shafts 25 and 26 carries beveled gears, as 27 and 28, which mesh with corresponding beveled gears 29 and 30, carried by a horizontally-driven shaft 31. The shaft 31 finds suitable bearings in journal-boxes 32 and 33, arranged on the base of the machine. The shaft 31 may be driven by any suitable power, (not shown,) and through the shafts 25 and 26 and the pinions 23 and 24 movement may be imparted to the gear-wheel 21. The gear-wheel 21 is preferably forced against the peripheries of the wheels 34, 38, and 39 by means of a series of rollers 20 20, carried by a frame 18 and arranged above the gear-wheel 21. The said frame 18 is formed at suitable intervals with rigidly-extending projections 17 17, which surround and move upon vertical standards 16 16, rising from the frame 9 just outside of the periphery of the gear-wheel 21. The upper ends of the standards 16 are provided with adjusting ends 37, between which and the upper surface of the frame 18 are interposed coiled springs 41, so that the frame 18 and the rollers 20 are forced with yielding pressure normally against the upper surface of the gear-wheel 21. Projections are also formed on the said frame 18, which receive the upper ends of the shafts 25 and 26, holding them in proper position. By means of the frame 18 and the springs 41 the gear-wheel 21 will be held in such position as to cause the rollers 34, 38, and 39 to engage in succession and depress the operating-levers 8 as the said gear-wheel 21 is rotated by means of the gearing above described.

In operating the device power is applied to the shaft 31, which in turn imparts motion to the gear-wheel 21 through the shafts 25 and 26 and pinions 23 and 24. As the gear-wheel 21 is rotated the rollers or wheels 39 will first come into engagement with the upwardly-projecting end of the lever 8. As the movement of the gear 21 and the wheel beneath it continues the wheel 38 will next engage the levers 8 and force them down still more, and finally the wheels 34 will roll upon the flat portions of the levers 8, depressing them to their fullest extent and bringing their outer ends flush with the surface of the frame 9. The arrangement of the wheels with respect to the levers 8 may be such that all the levers are depressed at one time; but, preferably, they are arranged so as to successively depress the levers, as indicated in Fig. 1. Thus some of the pumps are always forcing liquid, while the pistons of the other pumps are returning in their strokes for further pumping action. Some of the pumps will thus always be feeding liquid in the air-chamber 12, which in turn will deliver it through the discharge-pipe 13 to any desirable point. It will thus be seen that in a very simple and economical way a series of pumps can be employed by continuous application of power and that a continuous flow of liquids of any desired power may be obtained.

Having thus fully described my invention, what I claim as new, and desire to secure by Letters Patent of the United States, is—

1. A pump mechanism, comprising a series of pumps, an air-chamber adapted to receive the flow of liquid through each pump, pump-levers connected with the pumps for operating the same, actuating-levers pivoted on the frame above the pump-levers and connected therewith, the said actuating-levers having curved end portions whereby they may be pivoted outside the same, and yet have their inner ends extend through apertures in the frame and capable of engaging depressions in the top of the said frame so as to lie flush with its upper surface, and a series of wheels for depressing the said levers and thereby operating the pumps, substantially as described.

2. In a pump mechanism, the combination with a suitable frame, of a pump within the same, an air-chamber adapted to receive a flow of liquid through said pump, a pump-lever connected with the pump for operating the same, an actuating-lever pivoted on the same above the pump-lever, and connected therewith, the said actuating-lever having a curved and slightly laterally-disposed end portion pivoted outside the frame, the inner end of said actuating-lever extending through No. 715,615. Patented Dec. 9, 1902.
C. J. SHIPWAY & H. MAY.
SHEEP SHEARS.
(Application filed July 8, 1902.)

(No Model.)

WITNESSES
Wm H Caufield
J. G. Dunbar

INVENTORS:
Cornelius John Shipway, and
Henry May,

BY W. B. Hutchinson ATTORNEY.